(No Model.) 3 Sheets—Sheet 1.
G. W. & W. P. LARAWAY.
MACHINERY FOR MOLDING DRUMS OR BARREL BODIES FROM PAPER PULP OR OTHER LIKE MATERIAL.
No. 308,615. Patented Dec. 2, 1884.
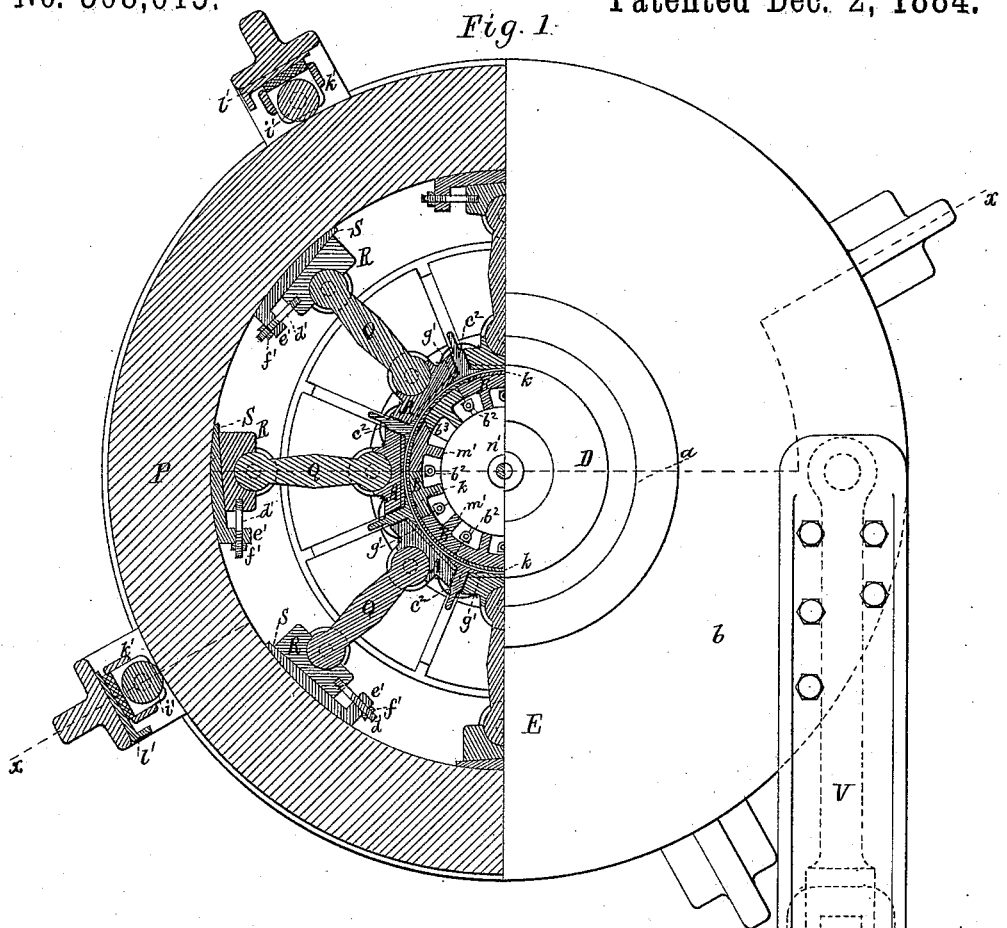
Fig. 1.
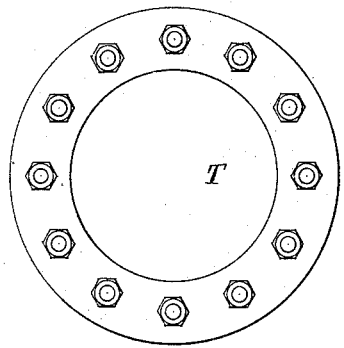
Fig. 4.
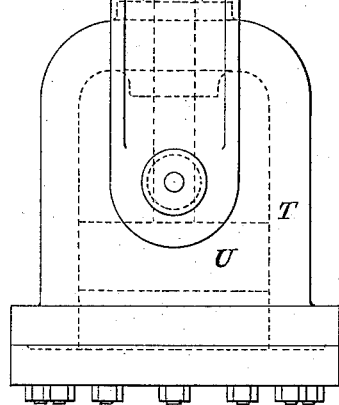
Witnesses.
S. N. Piper
E. B. Pratt
Inventors,
Geo. Washington Laraway.
Wm. Phillips Laraway.
by R. H. Eddy atty.

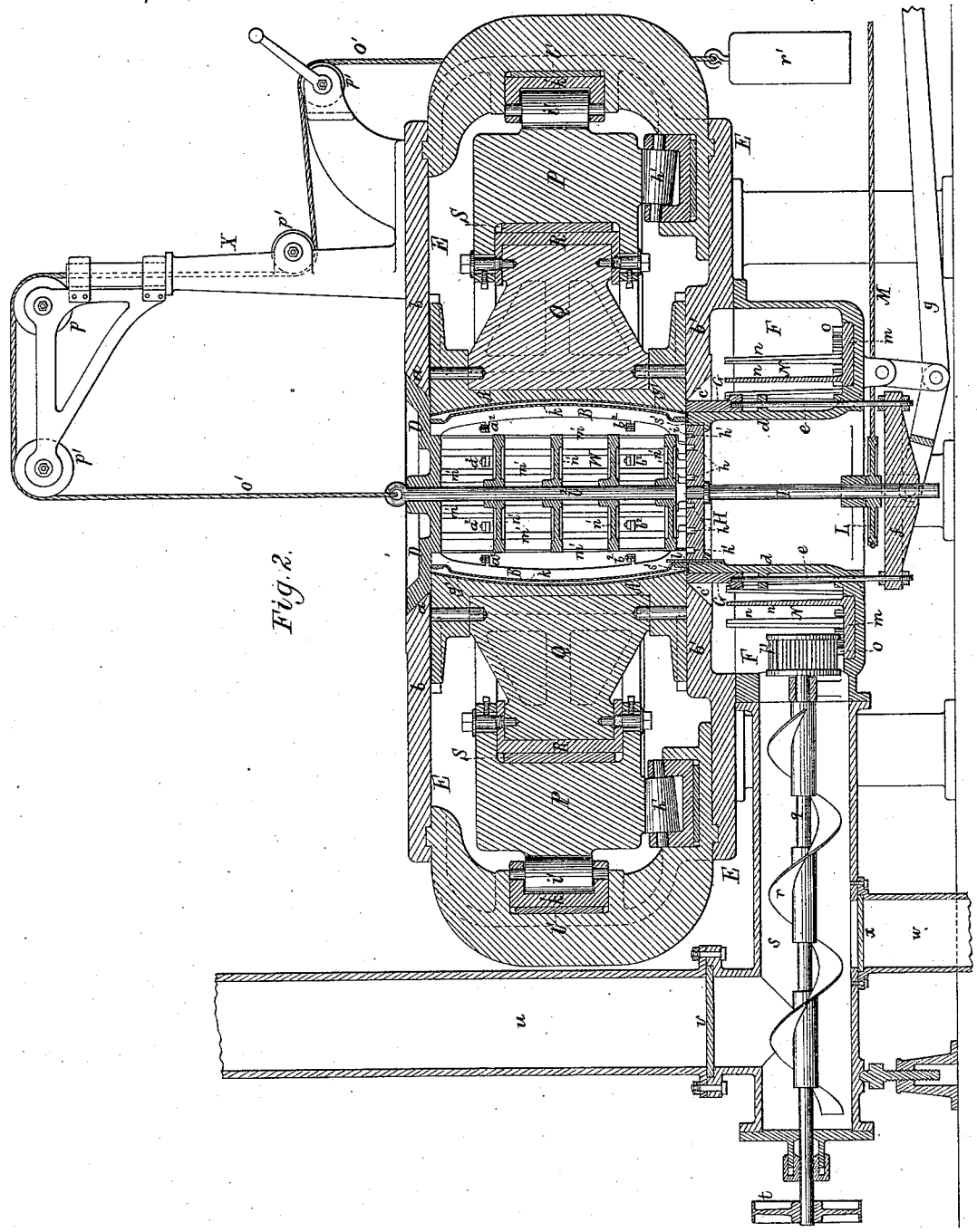

(No Model.) 3 Sheets—Sheet 3.

G. W. & W. P. LARAWAY.
MACHINERY FOR MOLDING DRUMS OR BARREL BODIES FROM PAPER PULP
OR OTHER LIKE MATERIAL.

No. 308,615. Patented Dec. 2, 1884.

Witnesses.
S. N. Piper
E. B. Pratt

Inventors.
Geo. Washington Laraway.
Wm. Phillips Laraway.
by R. H. Eddy atty.

UNITED STATES PATENT OFFICE.

GEORGE WASHINGTON LARAWAY AND WILLIAM PHILLIPS LARAWAY, OF HARTFORD, CONNECTICUT, ASSIGNORS, BY MESNE ASSIGNMENTS, TO SAID GEORGE WASHINGTON LARAWAY, AND JOHN F. SEIBERLING, OF AKRON, OHIO.

MACHINERY FOR MOLDING DRUMS OR BARREL-BODIES FROM PAPER-PULP OR OTHER LIKE MATERIAL.

SPECIFICATION forming part of Letters Patent No. 308,615, dated December 2, 1884.

Application filed February 23, 1884. Renewed November 3, 1884. (No model.)

*To all whom it may concern:*

Be it known that we, GEORGE WASHINGTON LARAWAY and WILLIAM PHILLIPS LARAWAY, of the city and county of Hartford, of the State of Connecticut, have invented a new and useful Improvement in Machinery for Molding Drums or Barrel-Bodies from Paper-Pulp or other like Material; and we do hereby declare the same to be described in the following specification and represented in the accompanying drawings, of which—

Figure 6:
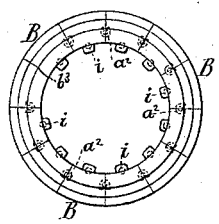
Figure 7:
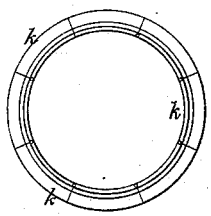
Figure 5:
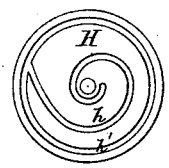
Figure 8:
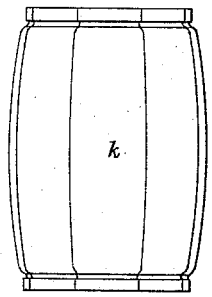
Figure 3:
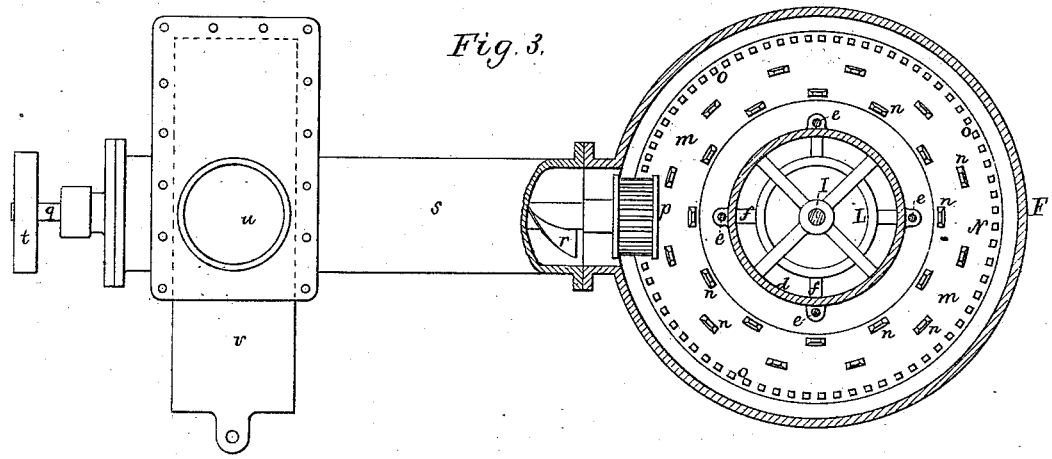

Figure 1 is a top view of a molding-machine of our improved kind, certain parts of it being shown in horizontal section in such figure. Fig. 2 is a vertical and transverse section of such machine on line $x\ x$ of Fig. 1. Fig. 3 is a top view of its induct and propeller-cylinder, and exhibiting the annular vat in horizontal section. Fig. 4 is an end view of the hydraulic press to be described. Fig. 5 is a top view of the circular plate H, hereinafter explained. Fig. 6 is a top view of the inner set of voussoirs, their connections, and end joint. Fig. 7 is a top view, and Fig. 8 a side elevation, of the series of metallic staves $k$, hereinafter described.

The nature of our invention is defined in the claims hereinafter presented.

In this machine are two concentric series of voussoirs, A A A, &c., and B B B, &c., those of each series being arranged in a circle or circular arch, such being represented in part in Fig. 1. The two series of voussoirs are disposed, as shown, in a frame, E. In a conical mouth, $a$, in the top plate, $b$, of such frame is a conical cap or cover, D. In the bottom plate, $b'$, of the said frame there is a conical mouth, $c'$, having extended up within it, as shown, the inner tubular portion, $d$, of an annular vat, F, such vat being closed at top and arranged beneath the frame E, in manner as represented. Encompassing the said part $d$ is an annular gate, G, from which rods $e$ extend down to and are fastened to a spider, $f$, pivoted to a lever, $g$, arranged as shown. Below the inner set of voussoirs is a circular plate, H, which is carried by a vertical shaft, I, and has in its upper surface a circular groove, $h'$, and leading out thereof and within its circle another or volute-shaped groove, $h$. A stud, $i$, from the lower end of each of the voussoirs of the inner set projects into the circular groove $h'$. The several voussoirs of the inner set are to be hinged together, the hinges being shown at $a^2\ b^2$. The joint $b^3$ between two next adjacent of the said voussoirs is to be so arranged or made as to enable one of the two to be moved inwardly, to move its stud $i$ from the circular into the spiral or volute shaped groove when the plate H is revolved. By revolving such plate the stud of each voussoir in succession will be caused to pass out of the circular and into the spiral groove, whereby the voussoirs in passing over the spiral groove will be drawn in, the object of so "drawing in" the voussoirs being to enable them to be moved inwardly in a manner to admit of a molded barrel-body and its supporting series of metallic staves $k$ to be removed from them. The said metallic staves $k$ are shown in horizontal section in Fig. 1, and in vertical section in Fig. 2, but more particularly in Figs. 7 and 8. They are to be jointed or hinged together, and they constitute a form and a jacket on which the barrel-body is to be made. They enable it, after its formation, and while encompassing them, to be transferred to a machine for drying it. One of the voussoirs of the inner set is secured to the tube $d$ by a plate, $l$, arranged as shown in Fig. 2, and fastened both to the voussoir and the tube. There is fixed on the lower end of the shaft I a grooved pulley, L, around which a belt, M, is to be run for effecting the turning of the shaft I and the scroll-grooved plate H, as circumstances may require, whether to expand or contract the voussoirs B. Within the annular vat is a rotary and annular agitator, N, which is composed of a flat ring, $m$, and a series of pins or arms, $n$, extending upward therefrom. The ring has a circular range, $o$, of teeth to engage with a lantern-pinion, $p$, fixed on a shaft, $q$, provided with a screw-propeller, $r$, and arranged with such in a tubular supply-cylinder, $s$, which, at its inner end, opens into the vat. The shaft is furnished with a wheel, $t$, for revolving it by means of an endless belt from a suitable motor. The cylinder $s$ is provided with an induct, $u$, for supplying to it pulp from a reservoir, there being to the induct a gate, $v$, for closing it. There is also to the cylinder an educt, $w$, provided with a gate, $x$. On pulp being let into the cylinder by the induct from a cistern or reservoir, when the gate $x$ is closed, such pulp, by the propeller in revolution, will be driven into the vat, and by the agitator, also in revolution, will be stirred, to prevent the heavier parts of it from settling. The gate G being down, and the outer set of voussoirs having been drawn back to their rearmost positions, the pulp will be forced upward from the vat into the space between the outer and the inner sets of voussoirs.

Between the voussoirs of the outer set there are overlaps $c^2$, arranged and formed in transverse section as shown in Fig. 1. These overlaps are to cover the joints between the voussoirs while such voussoirs are being moved radially as well as when they may be at rest.

The outer set of voussoirs has mechanism for moving each of its voussoirs rectilinearly and in a radial direction to their common axis. This mechanism consists of a stout metallic ring, P, and a series of toggles, Q, the said toggles corresponding in number to that of the voussoirs of the set. Each voussoir has a toggle jointed to it and to an adjustable box, R, duly supported by the ring and resting against a wedge, S, disposed between such box and the inner periphery of the ring. A screw, $d'$, projects from the box through an ear, $e'$, extending from the wedge, a nut, $f'$, being screwed on the screw. By means of such nut and screw the wedge can be driven forward, as occasion may require, for adjusting the connected voussoir for its proper action on the barrel-body. Each of the outer sets of voussoirs we usually make of cast-iron, and have to such a face, $g'$, of steel. The ring P rests on a series of friction-rollers, $h'$, arranged in the frame E. At its outer periphery the said ring bears against another set of friction-rollers, $i'$, arranged in the said frame, each of such friction-rollers being supported in a suitable carrier, $k'$, between which and the frame E there is a wedge, $l'$, for moving the carrier to cause its roller to properly bear against the ring. By partially revolving the ring the several voussoirs of the outer set will be simultaneously moved outwardly in radial directions, a counter movement of the ring producing inward movements of the voussoirs. For moving the said ring in manner as explained, we employ one or more hydraulic presses, the cylinder of one of which is shown at T, the piston U (shown in dotted lines) of it being connected to the ring by one or a pair of connecting-rods, V. Each stroke of the said piston will cause the ring to be moved to operate the toggles and their voussoirs. Each internal voussoir has projecting from it inwardly and longitudinally of it a flange, $m'$, whose inner edge is straight, and there extends down within the space encompassed by the said inner set of voussoirs, which we term their "supporter" W, which consists of a series of disks, $n'$, and a rod, $l^2$, on which they are arranged as represented. A rope, $o'$, fastened at one end to the rod, is carried about the grooved wheels $p'$ of a crane, X, arranged as shown, there being attached to the rope at its outer end a counterbalance-weight, $r'$. By means of the said rope the supporter, as circumstances may require, can be raised out of or introduced into the space encompassed by the inner set of voussoirs. The crane enables the supporter to be moved laterally from over such space.

On the top of the tube $d$ there is laid a strainer or ring, $s'$, perforated with holes extending down through it, and corrugated or grooved on its lower surface, or otherwise constructed, to allow and cause the discharge into the bore of the tube of water expressed from the pulp by the outer set of voussoirs while they may be advancing. We prefer to have a movable ring so made rather than to have holes in the tube itself, which such tube may have to discharge the water. Such ring, however, in case any of its holes or passages become clogged with pulp, can be readily removed from the tube and cleaned.

The operation of the above-described machine may be thus explained: On the gate $v$ being opened, the pulp will flow down into the cylinder $s$, and by the screw or propeller thereof will be driven into the vat, wherein it will be agitated by the rotary agitator in revolution. The gate G being opened and the outer set of voussoirs having been drawn back, the pulp will be forced upward into the space between them and the folding jacket encompassing the inner set of voussoirs. Next the ring P is to be revolved to cause by means of the toggles the outer set of voussoirs to be driven forward, and in so doing compress the pulp, and with the jacket impart to it the form of the drum or barrel-body, the water from the pulp escaping through the strainer $s'$ into the tube $d$. This having been accomplished, the gates $v$ and G are to be shut, and the gate $x$ is to be opened, if necessary, in order to prevent the pulp or water therefrom from being driven upward into the space between the outer set of voussoirs, while the inner set of voussoirs are being collapsed or turned inward, and the supporter thereof and the jacket and its encompassing mass of pulp are being removed, which constitutes the next part of the operation. From this machine the jacket and barrel-body of pulp thereon are to be transferred to a machine or means for drying the said barrel-body.

We claim—

1. The combination of the annular vat and the agitator thereof, provided with mechanism for revolving such agitator, with the two series of voussoirs having mechanism for operating them, essentially as described, and with the movable supporter of the inner series of such voussoirs, all being substantially as represented.

2. The combination of the pulp-supplying cylinder provided with the propeller and with the induct and educt and their gates, as shown, with the annular vat and agitator, the mechanism for operating the latter, and with the two sets of voussoirs, and the supporter of the inner set thereof, having mechanisms for actuating such voussoirs, as explained, all being substantially as specified and represented.

3. The combination of the folding series of metallic staves $k$ with the two sets of voussoirs, the supporter of the inner set thereof, the mechanisms for actuating the voussoirs, the annular vat, and the agitator therein, such agitator having means of revolving it, as set forth.

4. The combination of the annular vat and the annular gate arranged therein and provided with mechanism for operating, as described, such gate, with the pulp-supply cylinder and its screw-propeller, having mechanism for actuating the latter, as explained, and with the two series of voussoirs and the supporter of the inner of them, all being substantially as specified, and such voussoirs having mechanisms for operating them, in manner essentially as set forth.

5. The combination of the separable strainer or water-discharging ring arranged in the top of the internal part or tube of the annular vat, with such vat and its gate, and with the two sets of voussoirs, and the supporter of the inner set, arranged with such ring as represented, such voussoirs having mechanisms for operating them, as explained.

6. The combination of the supply-cylinder having an induct and educt, and gates thereto, as set forth, the screw-propeller, its shaft and lantern-pinion, the annular agitator having teeth to engage with the said pinion, the annular vat and its gate, the movable supporter of the inner set of voussoirs, and the two series of voussoirs having mechanisms for working them, essentially as explained, all being arranged and constructed in manner to operate substantially and for the purpose as represented.

GEORGE WASHINGTON LARAWAY.
WILLIAM PHILLIPS LARAWAY.

Witnesses:
R. H. EDDY,
E. B. PRATT.